UNITED STATES PATENT OFFICE.

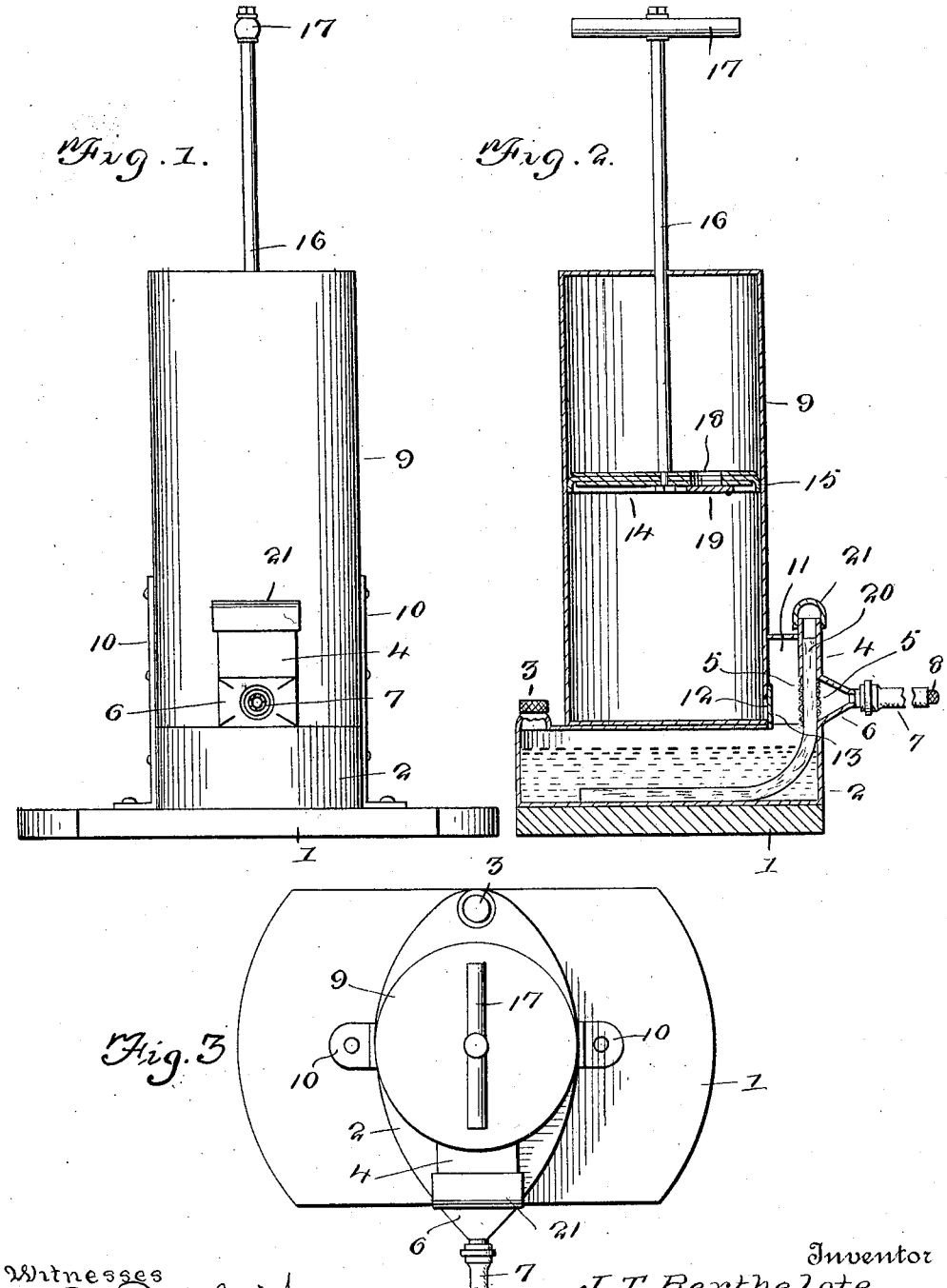

JOSEPH T. BERTHELOTE, OF HAVRE, MONTANA.

ANIMAL-EXTERMINATOR.

1,328,117.     Specification of Letters Patent.     Patented Jan. 13, 1920.

Application filed September 28, 1918. Serial No. 256,039.

*To all whom it may concern:*

Be it known that I, JOSEPH T. BERTHELOTE, a citizen of the United States, residing at Havre, in the county of Hill and State of Montana, have invented new and useful Improvements in Animal-Exterminators, of which the following is a specification.

This invention is an improved animal exterminator, for exterminating gophers, rats and other burrowing animals, the object of the invention being to provide an improved apparatus of this kind which is simple in construction, can be readily carried from place to place and operated manually, and by means of which burrowing animals can be readily and quickly exterminated.

With the above and other objects in view, the invention consists in the construction, combination and arrangement of devices hereinafter described and claimed.

In the drawings:

Figure 1 is an elevation of an animal exterminator constructed and arranged in accordance with my invention.

Fig. 2 is a sectional view of the same at right angles to Fig. 1.

Fig. 3 is a plan of the same.

In the embodiment of my invention, I provide a base board 1 on which is a tank 2 which has a filler nipple 3 and is also provided, on the upper side, with a wick tube 4 which rises therefrom and which has screens 5 in opposite sides. A nipple 6 projects from the outer side of the wick tube at a point opposite the screens and a rubber or other flexible hose 7 is attached to the nipple and is provided at its outer end with a suitable nozzle screen 8 which may be inserted in the burrow of an animal.

On the upper side of the tank is the cylinder 9 of an air compressing pump, the said cylinder and the tank being here shown as secured in place and on the base by means of angle brackets 10 which are secured thereto and also to the base and which are arranged on opposite side of the tank and cylinder. A chamber 11 is formed between one side of the cylinder and the wick tube and said side of the cylinder is provided, at a point near the bottom, with an opening 12 and with an outwardly opening valve 13. A plunger 14 is arranged for movement vertically in the cylinder, is provided with suitable packing 15 and also with an operating rod 16, said rod having a handle 17 near its upper end. The plunger has an opening 18 and has also a downwardly opening valve 19 which serves to uncover said opening on the upstroke of the plunger and to close the same on the downstroke thereof.

A wick 20 extends through the wick tube and has its lower portion arranged in the tank. In practice, the tank is supplied with bi-sulfid or carbon or other suitable poisonous and volatile liquid. The wick absorbs the liquid poison as will be understood. A suitable cap 21 is preferably provided for the upper end of the wick tube.

When the device has been arranged in place and with the hose arranged to discharge in a burrow, by operating the air compressing pump compressed air is forced through the wick, thereby generating a highly poisonous gas and also forcing such gas into the burrow with the result that all of the animals in the burrow are speedily exterminated.

While I have herein shown and described a preferred embodiment of my invention, I would have it understood that changes may be made in the form, proportion and construction of the several parts without departing from the spirit of my invention and within the scope of the appended claims.

Having thus described my invention, I claim:

1. A device of the character described comprising a casing constituting a reservoir for a volatile liquid, a wick guide at one side of said casing, the said side of said casing forming a portion of the wick guide and being provided with an opening surrounded by an outwardly extending nipple, a flexible conducting member engaged upon said nipple, a wire screen covering said opening, and means for directing a blast of air through said wick at said opening.

2. A device of the character described comprising a supporting base, a casing disposed thereon and serving as a reservoir for a volatile liquid, one wall of said casing being provided with an opening surrounded by an outwardly extending nipple, a conducting member connected with said nipple, a wire screen covering said opening, a wick guide formed at said side of the casing and having a wire screen portion alining with said first named wire screen, a wick within said guide extending across said openings, and means for directing a blast of air into said casing, through said wire screens and said wick into said nipple and conducting member.

3. A device of the character described comprising a casing forming a liquid reservoir, an upwardly extending portion formed at one side of said casing, a pump barrel rising from said casing and having one side formed as one wall of said extension, a wick guide in said extension, one side of the extension constituting a portion of the wick guide, said side being provided with an opening surrounded by an external nipple and covered by a wire screen, the opposite portion of said wick guide being formed as a wire screen, a wick within said guide, an outwardly opening valve at the lower portion of said pump barrel in alinement with said wire screens and said opening, and a reciprocatory piston within said pump barrel for forcing a blast of air through said wick into said nipple.

In testimony whereof I affix my signature.

JOSEPH T. BERTHELOTE.